(12) United States Patent
Moughton (10) Patent No.: US 11,234,559 B2
(45) Date of Patent: Feb. 1, 2022

(54) APPARATUS FOR HEATING FOOD (71) Applicant: Strix Limited, Isle of Man (GB)

(72) Inventor: Colin Moughton, Port St. Mary (GB)

(73) Assignee: Strix Limited, Ronaldsway (IM)

( * ) Notice: Subject to any disclaimer, the term of this patent is extended or adjusted under 35 U.S.C. 154(b) by 560 days.

(21) Appl. No.: 15/542,098

(22) PCT Filed: Jan. 8, 2016

(86) PCT No.: PCT/GB2016/050045
§ 371 (c)(1),
(2) Date: Jul. 7, 2017

(87) PCT Pub. No.: WO2016/110713
PCT Pub. Date: Jul. 14, 2016

(65) Prior Publication Data
US 2018/0271325 A1   Sep. 27, 2018

(30) Foreign Application Priority Data
Jan. 9, 2015 (GB) ..................................... 1500342

(51) Int. Cl.
*A47J 37/08* (2006.01)
(52) U.S. Cl.
CPC ................. *A47J 37/0835* (2013.01)
(58) Field of Classification Search
CPC .... A47J 37/08; A47J 37/0835; A47J 37/0842; A47J 37/0857; A47J 37/0807;
(Continued)

(56) References Cited

U.S. PATENT DOCUMENTS 2,254,946 A * 9/1941 Ireland ................. H01H 43/304
99/329 R
2,364,175 A 12/1944 Turner
(Continued)

FOREIGN PATENT DOCUMENTS

CN 1074822 8/1993
CN 2159731 3/1994
(Continued)

OTHER PUBLICATIONS

Chinese office action for CN201680005225.3 dated Jul. 3, 2019.
(Continued)

*Primary Examiner* — Ibrahime A Abraham
*Assistant Examiner* — William C. Gibson
(74) *Attorney, Agent, or Firm* — Getz Balich LLC (57) ABSTRACT

An apparatus is provided for toasting a food item arranged to receive and support the food item during toasting. The apparatus includes a heating element assembly arranged to heat the surface of the food item by radiant heat. The apparatus is arranged to operate in a first mode where the heating element assembly operates at a first power and a second mode where the heating element assembly operates at a second power. The apparatus further includes a thermally sensitive actuator having a first and a second position and being arranged to switch from the first mode to the second mode at a predetermined temperature by moving from the first position to the second position. The apparatus further includes an arrangement for forcing the actuator to return to its first position.

17 Claims, 5 Drawing Sheets

(58) Field of Classification Search
CPC .. A47J 37/0632; A47J 37/0871; A47J 19/027; A47J 27/21133; A47J 36/32; F24C 7/087; H05B 1/0261; H05B 1/02; H01H 43/304; H01H 89/04; Y10T 137/7737
See application file for complete search history.

(56) References Cited

U.S. PATENT DOCUMENTS

| | | | |
|---|---|---|---|
| 2,486,621 A * | 11/1949 | White | A47J 37/0814 60/529 |
| 2,563,755 A * | 8/1951 | Sutton | H01H 43/304 99/329 R |
| 2,604,032 A | 7/1952 | Dooley | |
| 2,684,427 A | 7/1954 | Gross | |
| 2,856,501 A | 10/1958 | Kueser | |
| 3,358,584 A | 12/1967 | Sutton | |
| 3,684,860 A * | 8/1972 | Snyder | A47J 37/0835 219/413 |
| 3,760,713 A * | 9/1973 | Sato | A47J 37/0814 99/391 |
| 3,819,904 A | 6/1974 | Novak | |
| 4,286,509 A | 9/1981 | Miller et al. | |
| 4,368,379 A | 1/1983 | Swanson | |
| 4,382,175 A * | 5/1983 | Huggler | A47J 37/085 219/396 |
| RE31,415 E | 10/1983 | Price et al. | |
| 4,510,376 A | 4/1985 | Schneider | |
| 5,036,179 A | 7/1991 | Westerberg et al. | |
| 5,094,154 A * | 3/1992 | Nopanen | A47J 37/0835 219/492 |
| 5,170,039 A | 12/1992 | Eisenberg | |
| 5,193,439 A | 3/1993 | Finesman et al. | |
| 5,319,171 A | 6/1994 | Tazawa | |
| 5,402,708 A | 4/1995 | Krasznai et al. | |
| 5,426,280 A | 6/1995 | Smith | |
| 5,644,974 A | 7/1997 | Slavin | |
| 5,802,957 A | 9/1998 | Wanat et al. | |
| 5,960,704 A | 10/1999 | March et al. | |
| 6,051,818 A | 4/2000 | Van Der Wal et al. | |
| 6,140,621 A | 10/2000 | Ho et al. | |
| 6,914,514 B2 | 7/2005 | Shepherd | |
| 7,424,978 B2 * | 9/2008 | Vasquez | F03G 7/065 236/101 D |
| 2001/0050277 A1 | 12/2001 | Friel | |
| 2003/0095029 A1 | 5/2003 | Shepherd | |
| 2003/0140796 A1 | 7/2003 | Wang | |
| 2003/0197002 A1 | 10/2003 | Lile et al. | |
| 2003/0213371 A1 | 11/2003 | Saunders | |
| 2004/0040953 A1 | 3/2004 | Lee et al. | |
| 2005/0077290 A1 | 4/2005 | Lee et al. | |
| 2007/0144453 A1 * | 6/2007 | Garrabrant | F23N 5/042 122/14.2 |
| 2008/0067166 A1 | 3/2008 | Yoder et al. | |
| 2011/0132202 A1 * | 6/2011 | Zhang | A47J 37/08 99/332 |
| 2013/0094841 A1 * | 4/2013 | Garvey | A47J 31/542 392/465 |
| 2013/0156906 A1 | 6/2013 | Raghavan et al. | |

FOREIGN PATENT DOCUMENTS

| | | |
|---|---|---|
| CN | 2446911 | 9/2001 |
| CN | 2488021 | 4/2002 |
| CN | 2617025 | 5/2004 |
| CN | 2618533 | 6/2004 |
| CN | 1779331 A | 5/2006 |
| CN | 101345160 | 1/2009 |
| CN | 201208182 | 3/2009 |
| CN | 201431359 | 3/2010 |
| JP | 60165429 | 8/1985 |
| JP | 6090862 | 4/1994 |
| JP | 8024144 | 1/1996 |
| KR | 20050083332 A | 8/2005 |
| WO | WO9963872 | 12/1999 |
| WO | WO0053068 A1 | 9/2000 |
| WO | WO2007013031 A2 | 2/2007 |

OTHER PUBLICATIONS

AU Examination Report for Appln. No. 2016205898 dated Jun. 1, 2018.

Chen "Turbo Toast Prototype Jet Engines Make Your Toast", Dec. 19, 2007, http://gizmodo.com/335843/turbo-toaster-prototype-jet-engines-make-your-toast.

State Intellectual Property Office of the People's Republic of China First Office Action dated Nov. 21, 2018 for Patent Application No. 201680005225.3.

* cited by examiner

APPARATUS FOR HEATING FOOD

This application is entitled to the benefit of, and incorporates by reference essential subject matter disclosed in PCT Application No. PCT/GB2016/050045 filed Jan. 8, 2016, which claims priority to GB Patent Application No. 1500342.9 filed Jan. 9, 2015.

BACKGROUND OF THE INVENTION

1. Technical Field

This invention relates to apparatus for dry heating of food e.g. toasters.

2. Background Information

Making toast using a dedicated appliance which comprises one or more vertical slots for receiving slices of bread and heats the bread to turn it into toast, remains extremely popular. The Applicant has recognized that there are essentially two stages involved in the process of making toast. The first stage is drying out the surface of the bread. The second is the browning process which is known as the Maillard effect. The Maillard effect is behind many cooking processes, and is responsible for the browning and change in taste in certain foodstuffs, for example meat, onions or bread, when they are cooked. The Maillard effect comprises a set of chemical reactions between an amino acid (usually from a protein) and carbonyl compounds, usually sugars. They react in the presence of heat to form flavor compounds, which in turn break down to form different compounds. The resulting combination of compounds determines the taste and smell of the food when it has finished cooking.

When making toast the length of time for which the bread is heated will influence the extent to which the Maillard effect proceeds and thus ultimately how much the toast is browned. However for a given degree of browning there is limited scope to reduce the amount of time required by increasing the power of the element since that would run a greater risk of burning. The basic time taken to toast bread has therefore remained little changed over the years.

A further complication arises in that the amount of time it takes a typical toaster to reach a working temperature varies significantly depending on the initial state of the toaster, i.e. whether or not it has been used recently and thus whether the toasting space is already warm. This makes it difficult to achieve a consistent degree of browning without resorting to complicated and expensive sensors and electronic controls since a toasting time set to allow the toasting space to be heated from cold (e.g. 20 degrees Celsius room temperature) and then brown the toast to a desired level, will lead to much browner or burnt toast if the toasting space starts at say 60 degrees Celsius from a previous cycle, as the bread will experience a higher temperature for more of the time.

SUMMARY OF THE DISCLOSURE

When viewed from a first aspect the present invention provides an apparatus for toasting a food item arranged to receive and support said food item during toasting and comprising a heating element assembly arranged to heat the surface of the food item by radiant heat, wherein the apparatus is arranged to operate in a first mode where the element assembly operates at a first power and a second mode where the heating element assembly operates at a second power, the apparatus further comprising a thermally sensitive actuator having a first and a second position and being arranged to switch from the first mode to the second mode at a predetermined temperature by moving from the first position to the second position, the apparatus further comprising an arrangement for forcing the actuator to return to its first position.

Thus it will be seen by those skilled in the art that in accordance with the invention a toasting apparatus is provided which operates in two different power modes. The change between the first mode and the second mode is effected by a thermally sensitive actuator reaching a predetermined temperature. The Applicant has found that this can be an effective way of ensuring that the apparatus spends the optimum amount of time in each power mode, allowing a faster overall toasting time and consistent browning without increasing the risk of burning. The use of a thermally sensitive actuator rather than, say a thermistor or thermocouple, minimizes the cost of the apparatus whilst ensuring reliability.

The Applicant has appreciated that the invention may also be advantageous in automatically accounting for changes in the supply voltage. Since the time spent in the first mode is determined by the temperature experienced by the thermally sensitive actuator, if the supply voltage is relatively low and so the heating element operates at a lower power, the apparatus spends a longer period of time in the first mode as it will take longer to reach the pre-determined temperature. On the other hand if a higher voltage is supplied, the heating element power will be increased but the apparatus spends less time in the first mode as the toasting space will more quickly reach the predetermined temperature.

In a set of embodiments the thermally sensitive actuator is a bimetallic actuator. The use of a bimetallic actuator is advantageous as the shape and material of the actuator can be tuned to cause it to operate and reset at specific temperatures (to within manufacturing tolerances). Bimetallic actuators are relatively inexpensive components in comparison to electronic circuits and detectors and are extremely reliable.

In a set of embodiments the thermally sensitive actuator is arranged to act upon a push rod when it moves from its first to its second position to cause the push rod to open or close a pair of contacts. These contacts could cause a change in power of the heating element assembly indirectly by providing an input signal to an electronic circuit controlling one or more elements or element portions. In a set of embodiments however the contacts directly make or break a circuit powering an element or element portion forming part of the heating element assembly and associated with one of the modes. For example the contacts may be arranged electrically in series with an element or element portion forming part of the heating element assembly. In a set of embodiments however the state of the contacts also provides an input signal to an electronic circuit controlling one or more aspects of operation of the apparatus e.g. when the second mode should be finished In a set of embodiments the contacts are provided by leaf springs. These may be mounted to a printed circuit board assembly (PCBA).

The apparatus comprises an arrangement for resetting the actuator (by forcing it to return to its first position) to allow the apparatus to be re-used quickly. Resetting the actuator may occur at the end of a cycle and is achievable when the actuator is below its operating temperature but still above its natural reset temperature. The arrangement could be a manual one i.e. requiring intervention by a user for example by means of a reset button. However in a set of embodiments the thermally sensitive actuator is arranged to be reset automatically at the end of the toasting cycle. In either method as described above the actuator is only capable of being fully reset once it has cooled below its operating temperature. A reset pressure may be applied to the actuator until this threshold is crossed.

The toasting apparatus preferably comprises a vertically moveable carriage, as is well known per se in the art. This may, for example, be held in an operative position against the force of an eject spring by an electromagnet in series with the heating element in the well-known manner. In a set of embodiments the moveable carriage is arranged to reset the thermally sensitive actuator. In an exemplary set of such embodiments a reset member is resiliently biased towards the thermally sensitive actuator to provide a reset force capable of moving the thermally sensitive actuator from its second to its first position. The reset member may be arranged so that it is held away from the actuator when the carriage is in the operative position but allowed to act on the actuator under its resilient bias when the carriage is released to eject the toast. This is advantageous as it provides a simple and reliable method for resetting the thermally sensitive actuator when the actuator is below its operating temperature but still above its natural reset temperature.

Typically a toasting apparatus comprises an inner compartment which houses the heating elements and receives the bread and is commonly called the 'hot box'. Normally the control components are located outside the hot box for protection. In a set of embodiments of the present invention however the thermally sensitive actuator is positioned inside the hot box. This is beneficial as it provides an accurate response to the temperature being experienced by the bread.

The power between the two modes could be altered by varying the current (or average current) to a single heating element. Preferably however the heating element assembly comprises at least two heating elements and the power between the two modes is altered by selectively energizing the heating elements. This is advantageous as it is a simple method of altering the power between each mode.

The elements may each have a small spatial volume, but in a preferred set of embodiments they are spatially distributed throughout the toaster (e.g. throughout the hot box). The elements may be arranged such that they heat different sides of the food item, but in a set of embodiments they are arranged such that both the elements are distributed around all sides of the food item. Alternatively, the elements may each maintain a small spatial volume, with a number of elements connected in series to form an effective first element, and a second set of elements connected to form an effective second element. These can therefore be controlled as two whole entities (the effective elements), or alternatively each element can be controlled individually in order to alter the total power of the effective element.

In a set of embodiments the second power is lower than the first power. Having the first mode at high power may be beneficial as it allows the toasting space to be heated rapidly, drying out the surface of the food item and thus bringing the onset of the Maillard effect more rapidly but then allowing toasting to occur without burning in the second mode.

In a set of embodiments the first power is between 1.8 kW and 2.6 kW, preferably 2.2 kW. In a set of embodiments the second power is between 0.9 kW and 1.3 kW, preferably 1.1 kW.

In a set of embodiments the power is changed by at least 50% in the first mode in comparison to the second mode.

In a set of embodiments the duration of the second mode is controlled by an electronic controller. At the end of the second mode the heating element may be switched off and the food item ejected (as described above), although this is not essential. It is conceivable for example that a very low power keep-warm mode could be employed. The duration of the second mode may be fixed or varied, for example depending on the level of browning set by a user. In a set of embodiments the duration of the second mode is (also) altered dependent upon the duration of the first mode. This may be advantageous in ensuring that a consistent level of toasting is achieved independent of starting conditions (for a given user setting). This would be facilitated where power, as previously discussed, to the element(s) is controlled by the electronic controller rather than being directly switched by the actuator.

In a set of embodiments the placement and operating temperature of the thermally sensitive actuator are such that the temperature at the surface of the food item is in the range 140° C. to 180° C., e.g. between 150° C. and 170° C., e.g. approximately 160° C. The operating temperature of the actuator necessary to achieve this may be relatively close if the actuator is placed physically close to the food item, or it may be significantly higher if the actuator is further away.

In a set of embodiments an aperture is provided in an outer wall of the apparatus, e.g. on the base thereof, near to the thermally sensitive actuator. This allows air in to circulate around the actuator, assisting in cooling the actuator below its operating temperature and so allowing the actuator to be reset more quickly. In a set of embodiments a shutter is provided selectively to close the aperture when the apparatus is being operated to heat the food item; and to open the aperture, and thereby allow air to circulate around the actuator, when the apparatus is not operational to heat the food item. The shutter may, for example, conveniently be coupled to the aforementioned moveable carriage (where provided). For example the shutter could be resiliently biased towards its open position but held closed when the carriage is in its operational (lowered) position.

In a further set of embodiments the power in the second heating mode is sufficiently lower than the power in the first heating mode, and the time spent in the second mode is such that the thermally sensitive actuator is able to cool below its operating temperature during the second mode and is therefore able to be reset immediately at the send of the second mode.

In a set of embodiments a fan is provided which is arranged to direct air across a surface of the food item. This may encourage moisture to evaporate from the surface of the food item more quickly and decrease overall cooking time. In a set of embodiments the fan is operated in the first mode and reduced in speed or switched off in the second mode. By reducing or, preferably, switching off the fan for the second mode, the food item can be heated by radiant heat from the element using the Maillard effect in the normal way. In a set of such embodiments the fan may be operated at the end of a heating cycle to assist in the cooling of the thermally sensitive actuator.

The apparatus preferably comprises one or more vertical slots for receiving the food item—e.g. a slice of bread. The food item is preferably supported in a vertical position in the apparatus, i.e. with its largest cross-sectional area being defined by a vertical plane.

As will be appreciated by those skilled in the art, features and embodiments of one aspect of the invention will also pertain to other aspects of the invention where technically relevant.

BRIEF DESCRIPTION OF THE DRAWINGS

An embodiment of the invention will now be described, by way of example only, with reference to the accompanying drawings in which.

DETAILED DESCRIPTION OF THE INVENTION

Figure 1:
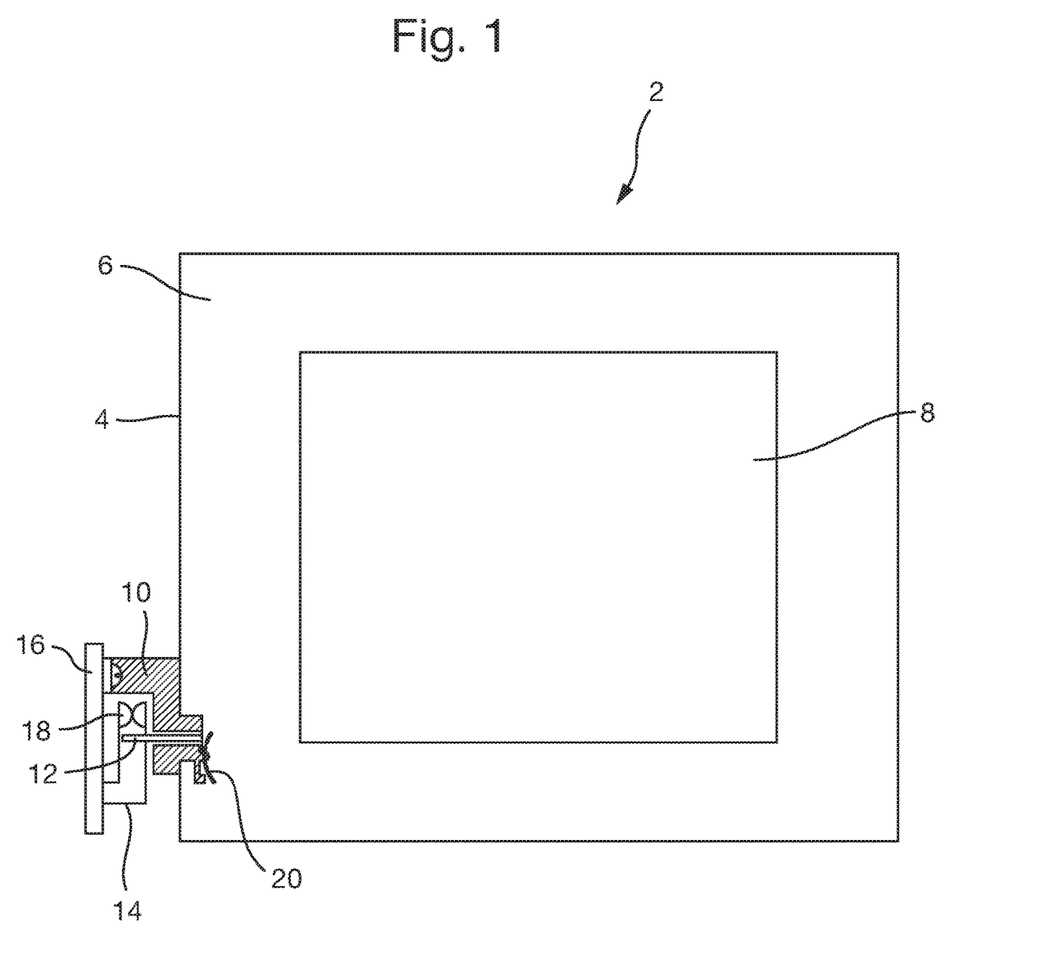
FIG. 1 shows a schematic lateral sectional view of an embodiment of the invention with outer casing removed for clarity.

FIG. 1 shows a schematic lateral sectional view of an embodiment of the invention in the form of a toaster 2. The outer decorative casing has been removed for clarity but an inner wall 4 may be seen which forms a so-called 'hot box' 6 which receives one or more slices of bread 8 to be toasted. Although not shown in the Figures, two independent electrical resistance heating elements are arranged around the edge of the hot box and also on both sides of any partition between individual slots. Each element may, for example have a nominal power of 1.1 kW.

The inner wall 4 defines an opening at the lower part of one side through which a plastic control housing 10 is mounted. The housing supports a push rod 12 which protrudes through the side wall 4 into the hot box 6 to engage with a bimetallic actuator 20 located in the hot box as will be described in more detail below with reference to FIG. 2. The other end of the push rod 12 engages with one of a pair of leaf springs 14 connected to a printed circuit board assembly (PCBA) 16. The leaf springs 14 carry respective contacts 18 at their distal ends. The PCBA 16 carries a microcontroller and various discrete components to control operation of the apparatus, specifically when the toasting cycle should be terminated.

Figure 2:
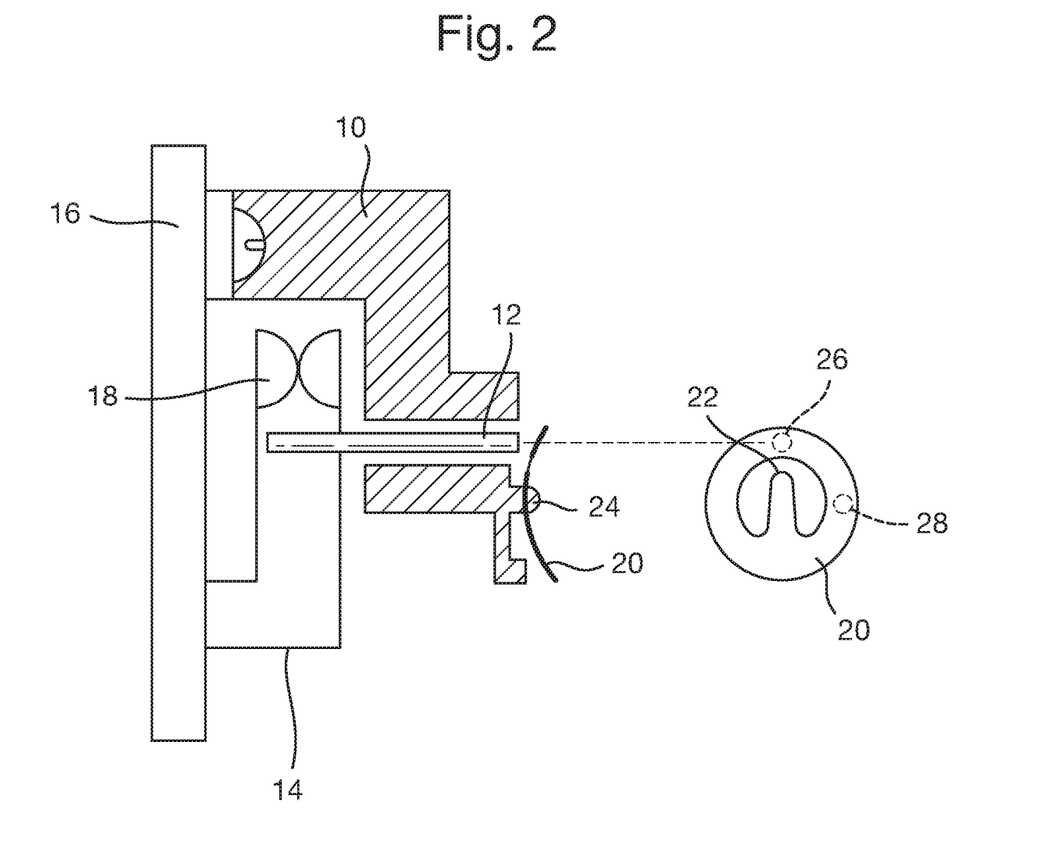
FIG. 2 shows a close-up sectional view of the bimetallic actuator and control housing and a separate front elevation of the actuator.

FIG. 2 is a more detailed view of the control housing 10 mounting the push rod 12 and the bimetallic actuator 20. As will be seen from the separate depiction of the bimetallic actuator, this is a snap-acting bimetallic actuator with a cut-out defining a central tongue 22 which is fixed to the control housing 10 at point 24. This could for example be by means of a stake, rivet or 'click-fit' arrangement. The push rod 12 is arranged to engage with the upper periphery 26 of the bimetallic actuator thereby giving maximum travel when the snaps from its first, ambient position shown in FIG. 2 to its second, reverse curvature position when it reaches its operating temperature. This travel is sufficient to move one of the leaf springs 14 far enough to separate their respective electrical contacts 18.

Figure 3:
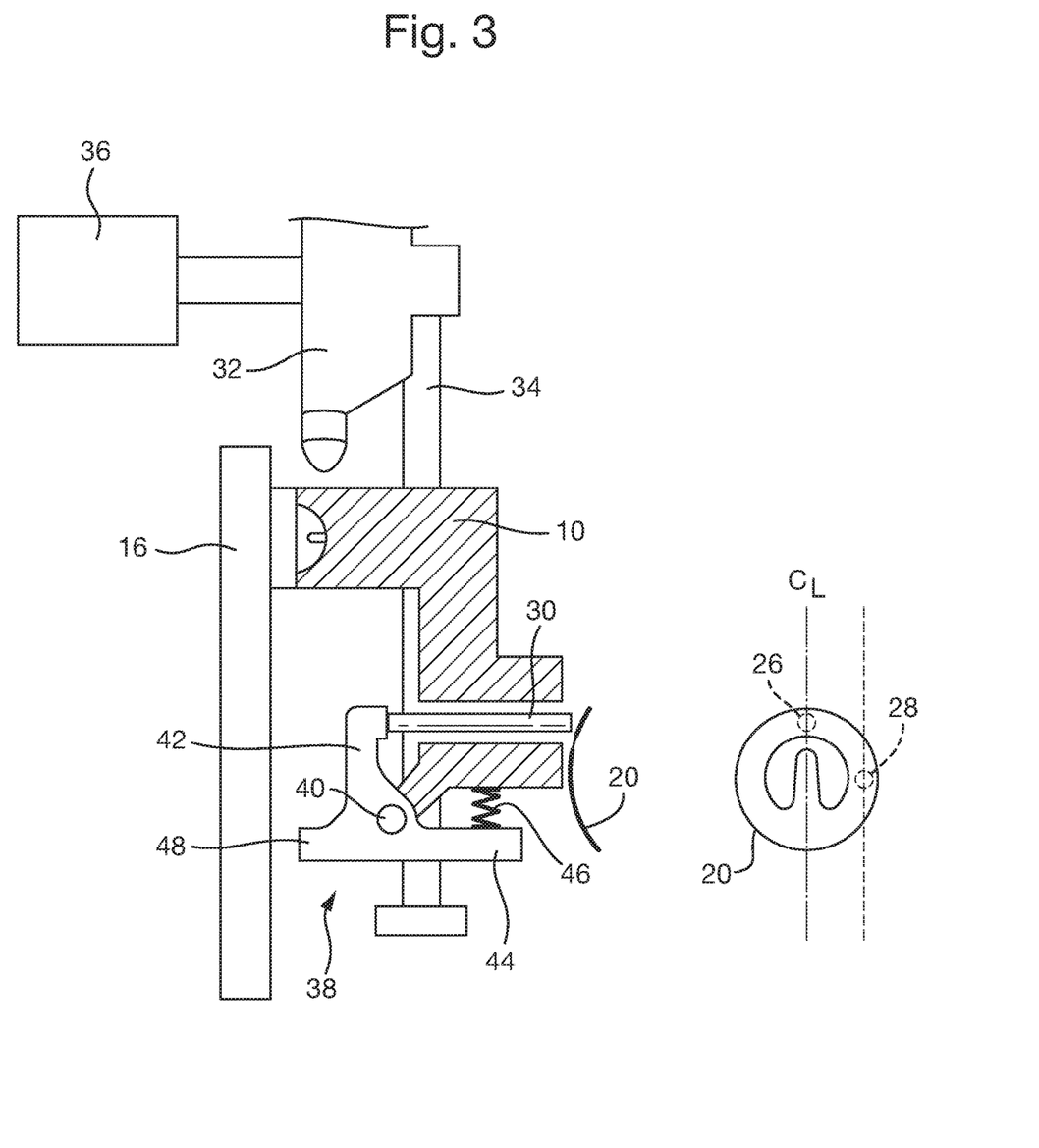
FIG. 3 shows the position of the push rod and the actuator when the toast carriage is in the up position.
Figure 4:
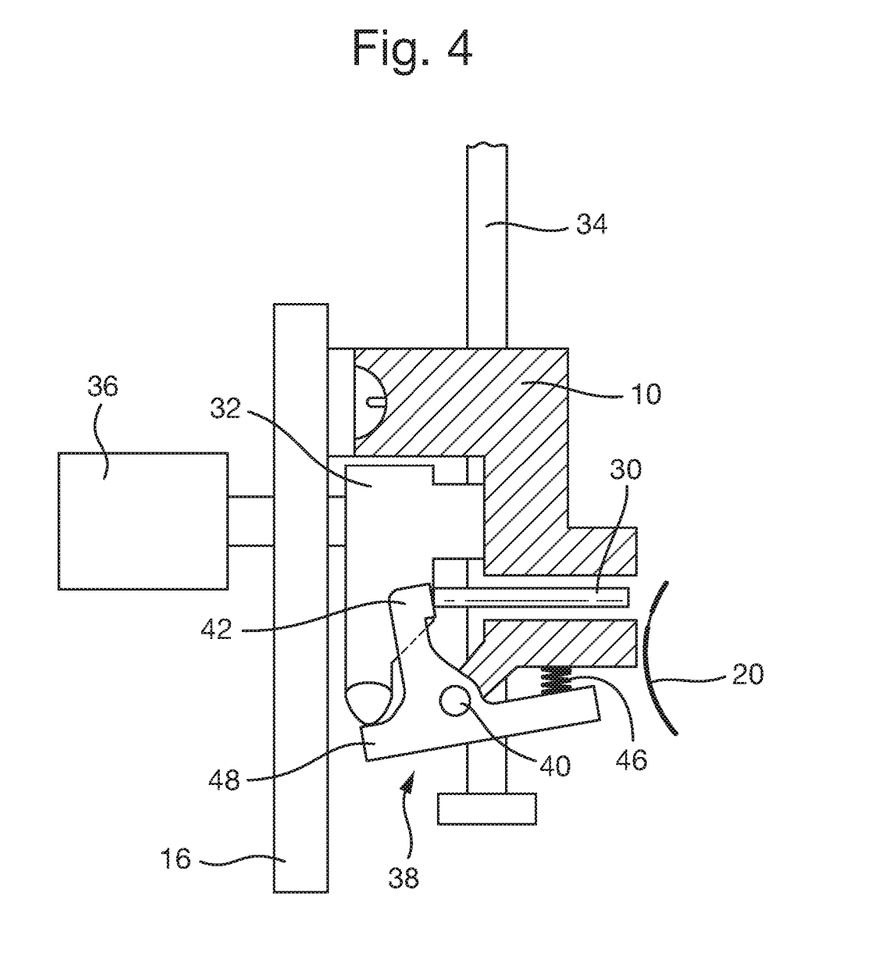
FIG. 4 shows the position of the push rod and the actuator when the toast carriage is in the down position.

As will be explained in greater detail below with reference to FIGS. 3 and 4, the actuator 20 may be forced to reset from the second, reverse curvature position, back to its first position upon operation of a reset mechanism for the bimetallic actuator 20 which bears on another, side part 28 of the periphery of the actuator. Resetting the bimetallic actuator is only possible once the bimetallic actuator has cooled below its operating temperature. FIGS. 3 and 4 show a different cross-section through the control housing 10 to illustrate a second push rod 30 which engages with the side part of the periphery of the actuator 28.

Also shown in FIGS. 3 and 4 is part of the toaster's vertically moving carriage mechanism which comprises a tray (not shown) which supports the bread 8 so that when the carriage is lowered the bread 8 is lowered into the hot box 6 and is automatically ejected after toasting has been completed. This carriage system includes a cam member 32 mounted for sliding movement on a vertical shaft 34. Also connected to the cam member 32 is a lever 36 which extends to the outside of the toaster through a slot in the outer housing of the toaster (not shown). This allows operation of the mechanism by a user to move it from the upper position shown in FIG. 3 to the lower, operative position shown in FIG. 4.

The reset mechanism comprises a reset member 38 which is mounted by means of a pivot 40 to the plastic control housing 10. The reset member 38 has two arms 42, 44 extending from the pivot 40 at right angles to each other to form a bell crank lever. One of the arms 42 engages the push rod 30 whilst the other arm 44 is acted upon by a compression spring 46 which provides a clockwise bias force to the reset member 38 which urges the upper arm 42 against the push rod 30. A protrusion 48 extends rearwardly from the member 38 such that it is engaged by the cam member 32 of the moving carriage mechanism when the latter is moved down to its lower operative position, as shown in FIG. 4. This holds the upper arm 42 of the reset member away from the push rod 30 against the bias from the spring 46.

Figure 5:
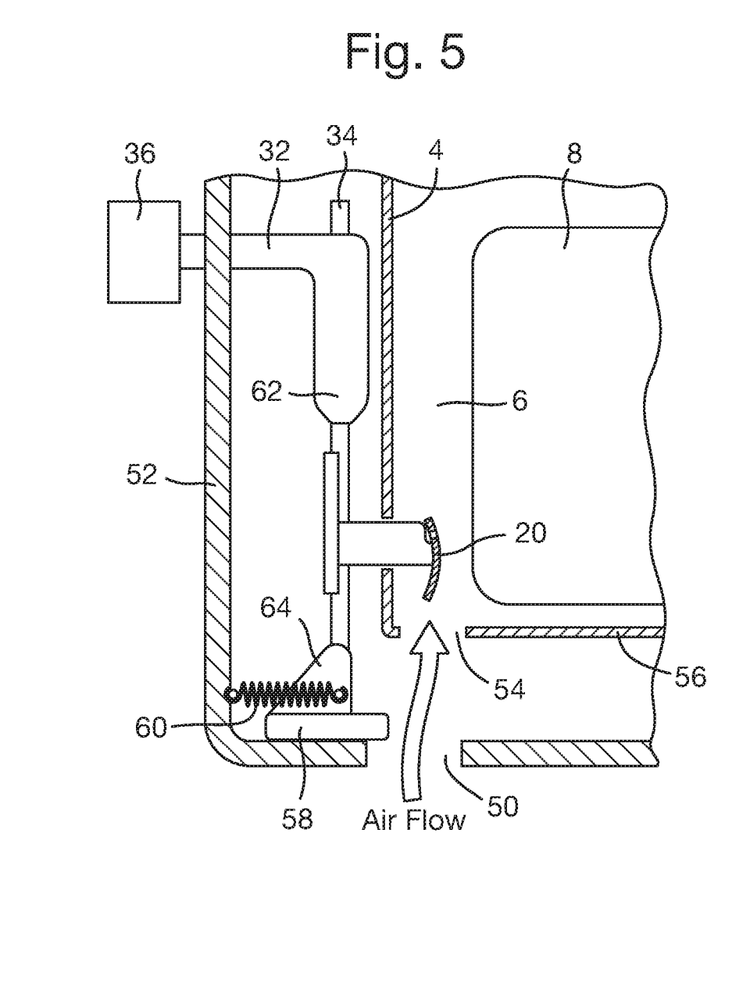
FIG. 5 shows schematically a shutter on the base of the appliance open to allow air to circulate around the bimetallic actuator.
Figure 6:
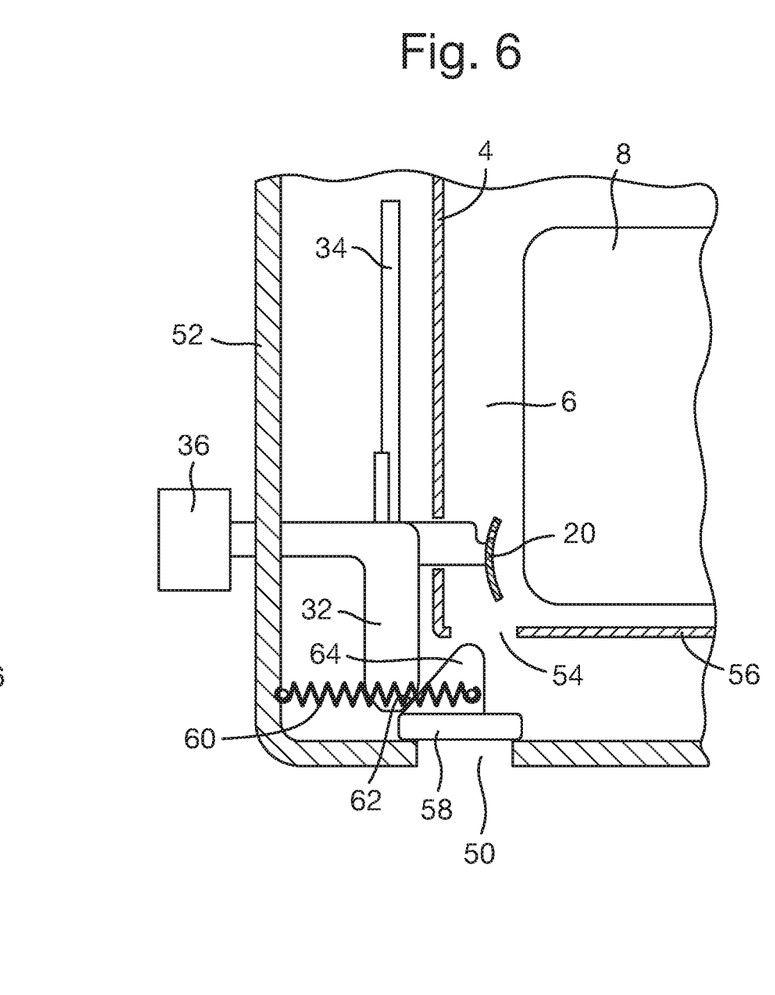
FIG. 6 shows a view similar to FIG. 5 with the shutter closed.

FIGS. 5 and 6 show a further, ventilation mechanism associated with the carriage mechanism. This comprises an aperture 50 in the base of the outer casing 52 of the toaster 2 and an aperture 54 in the base 56 of the hotbox 6. The purpose of these apertures 50, 54 is to provide an inlet for air, outside of the toaster 2, to enter to assist in cooling the bimetallic actuator 20 after it has operated to below its operating temperature thus enabling it to be reset. As the temperature of the air outside of the toasting space, i.e. below the hot box 6, is considerably cooler than the air inside, when the aperture 50 is open cooler air is drawn into the hot box 6, via the apertures 50, 54 as hot air escapes from the top of the toaster 2 which causes the bimetallic actuator 20 to cool quickly to below its operating temperature so that it can be returned to its first position by the reset mechanism.

A horizontally sliding shutter 58 is provided which is able to close the aperture 50. This is acted on by a tension spring 60 which acts to bias the shutter 58 to its open position. However as seen in FIG. 6, when the user presses the handle 36 down to begin the toasting operation, a camming surface 62 on the cam member 32 engages a diagonal surface 64 on the shutter member to cause it to close the aperture 50 against the spring bias. This prevents leakage of hot air through the aperture 50 when the bread is being heated.

In operation of the toaster 2, bread 8 is inserted into one or more slots in the top of the housing so as to be received by the tray (not shown) which forms part of the carriage mechanism and the lever 36 is depressed. This causes the bread 8 to be lowered into the hot box 6. It also causes the cam member 32 to move down the shaft 34 which pushes the reset arm 38 away from the push rod 30 (FIG. 4). The cam member 32 also acts to push the shutter 52 horizontally to cover the aperture 50 (FIG. 6).

As is conventional lowering the carriage by the lever 36 also closes a circuit which begins the toasting cycle and latches the carriage down by means of an electromagnet (not shown).

At this stage the bimetallic actuator 20 should be in its first position as shown in FIG. 3 for example and thus the leaf spring contacts 18 are closed. This causes the microcontroller to energize both heating elements giving 2.2 kW of heating power. The temperature inside the hot box 6 therefore rapidly increases and dries out the surface of the bread. Once the temperature inside the hot box 6 has reached a temperature which corresponds to the surface of the bread being approximately 160° C. the apparatus enters a second mode in which the bimetallic actuator 20 snaps into its second, reverse curvature position which pushes the push rod 12 horizontally and so separates the leaf spring contacts 18 which de-energizes one of the heating elements leaving only one heating element energized. The hot box 6 is therefore only heated at a power of 1.1 kW. The consequent interruption in signal to the microcontroller causes it to record the time of the first mode and to begin a timer for the second mode.

The second mode continues for a time which is determined by the microcontroller. The time is selected on the basis of the degree of browning selected by the user and the duration of the first mode. For example if the hot box was still warm from an earlier toasting cycle, the bread will only experience the higher power first mode for a short time and is likely to need slightly longer in the second mode, in comparison to bread which has spent longer in the first mode if the toaster was cold to begin with. Once the predetermined time has elapsed, the electromagnet which holds the carriage in the lower position is de-energized which releases the carriage to return to its original position and also de-energizes the remaining heating element. As the carriage moves upwards it raises the cam member 32 and so allows the spring 60 to act on the shutter 58 to retract it towards the outer housing wall 52 which opens the aperture 50 to allow cool air into the aperture 54 and so into the hot box 6 to cool the bimetallic actuator 20 (FIG. 5). Additionally as the member 32 moves upwards, this allows the reset arm 38 to be pushed by the reset spring 46 to bear on the push rod 30 which then presses the edge 28 of the bimetallic actuator 20. Once the bimetallic actuator 20 has cooled to below its operating temperature the force provided by the reset arm 38 is sufficient to force the bimetallic actuator 20 back into its first position and reset it.

If the user wishes to use the toaster 2 again in a period of time shortly after it has been used they simply insert some more bread 8 and depress the lever 36. The hot box 6 will already be above the ambient room temperature. For example it might be at approximately 60° C. The same process as described above takes place, however the time spent in the first mode, where both of the heating elements are energized, will be reduced as the bimetallic actuator 20 will reach its operating temperature more quickly. As mentioned above this may cause the second mode to be extended slightly but the overall toasting time is likely to be shorter than when the toaster is cold.

Thus it will be seen that the described embodiment provides a simple and effective way of achieving a faster toasting cycle time than conventional toasters without a commensurate increase in risk of burning.

Many variations and modifications are possible within the scope of the invention. For example the principles may be used to heat/cook other food items. A fan may be used to accelerate the first mode further. There may be no aperture or shutter mechanism. This may be for example because the power and duration of the second mode are such that cooling of the bimetallic actuator below its operating temperature occurs naturally during the second mode.

What is claimed is:

1. An apparatus for toasting a food item arranged to receive and support said food item during toasting and comprising a heating element arranged to heat a surface of the food item by radiant heat, and an inner compartment that houses the heating element and adapted to receive the food item, wherein the apparatus is arranged to operate in a first mode where the heating element operates at a first power and a second mode where the heating element operates at a second power, the apparatus further comprising a mode-switching snap-acting thermally sensitive actuator positioned within the inner compartment so as to be responsive to a temperature within the inner compartment, the mode-switching snap-acting thermally sensitive actuator having a first position and a second position and being arranged to switch from the first mode to the second mode at a predetermined temperature by snapping from the first position to the second position, the apparatus further comprising a vertically moveable carriage, wherein the vertically moveable carriage is arranged to force the mode-switching snap-acting thermally sensitive actuator to return to the first position.

2. The apparatus as claimed in claim 1, wherein the mode-switching snap-acting thermally sensitive actuator is a bimetallic actuator.

3. The apparatus as claimed in claim 1, wherein the mode-switching snap-acting thermally sensitive actuator is arranged to act upon a push rod when the mode-switching snap-acting thermally sensitive actuator moves from the first to the second position to cause the push rod to open or close a pair of contacts.

4. The apparatus as claimed in claim 3, wherein the contacts directly make or break a circuit powering an element or element portion forming part of the heating element and associated with one of the first and second modes.

5. The apparatus as claimed in claim 3, wherein a state of the contacts also provides an input signal to an electronic circuit controlling one or more aspects of operation of the apparatus.

6. The apparatus as claimed in claim 3, wherein the pair of contacts are provided by leaf springs.

7. The apparatus as claimed in claim 1, wherein the mode-switching snap-acting thermally sensitive actuator is arranged to be reset automatically at the end of a toasting cycle.

8. The apparatus as claimed in claim 1, comprising a reset member resiliently biased towards the mode-switching snap-acting thermally sensitive actuator to provide a reset force capable of moving the mode-switching snap-acting thermally sensitive actuator from the second to the first position.

9. The apparatus as claimed in claim 8, wherein the reset member is arranged so that the reset member is held away from the mode-switching snap-acting thermally sensitive actuator when the vertically moveable carriage is in an operative position but allowed to act on the mode-switching snap-acting thermally sensitive actuator under the resilient bias when the vertically moveable carriage is released to eject the food item.

10. The apparatus as claimed in claim 1, wherein the heating element comprises at least two heating elements and the power between the first and second modes is altered by selectively energizing the heating elements.

11. The apparatus as claimed in claim 1, wherein the second power is lower than the first power.

12. The apparatus as claimed in claim 1, comprising an aperture in an outer wall of the apparatus near to the mode-switching snap-acting thermally sensitive actuator.

13. The apparatus as claimed in claim 12, comprising a shutter, the apparatus being arranged selectively to close the aperture when the apparatus is being operated to heat the food item; and to open the aperture, and thereby allow air to circulate around the mode-switching snap-acting thermally sensitive actuator, when the apparatus is not operational to heat the food item.

14. The apparatus as claimed in claim 13, wherein the shutter is coupled to the vertically moveable carriage.

15. The apparatus as claimed in claim 14, wherein the shutter is resiliently biased towards its open position but held closed when the carriage is in an operational position to heat the food item.

16. The apparatus as claimed in claim 1, wherein the second power in the second mode is lower than the first power in the first mode, and a time spent in the second mode is such that the mode-switching snap-acting thermally sensitive actuator is able to cool below an operating temperature during the second mode and is therefore able to be reset immediately at the end of the second mode.

17. The apparatus as claimed in claim 1 wherein the mode-switching snap-acting thermally sensitive actuator has a natural reset temperature and the vertically moveable carriage is arranged to force the mode-switching snap-acting thermally sensitive actuator to return to said first position when said actuator is still above said natural reset temperature.

* * * * *